United States Patent
Wu et al.

(10) Patent No.: US 12,342,186 B2
(45) Date of Patent: Jun. 24, 2025

(54) BEAM REPORTING TRIGGERED BY DATA TRANSMISSION

(71) Applicant: Nokia Technologies Oy, Espoo (FI)

(72) Inventors: Chunli Wu, Beijing (CN); Samuli Turtinen, Ii (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 394 days.

(21) Appl. No.: 17/995,321

(22) PCT Filed: Apr. 8, 2020

(86) PCT No.: PCT/CN2020/083817
§ 371 (c)(1),
(2) Date: Oct. 3, 2022

(87) PCT Pub. No.: WO2021/203322
PCT Pub. Date: Oct. 14, 2021

(65) Prior Publication Data
US 2023/0164583 A1    May 25, 2023

(51) Int. Cl.
*H04W 16/28* (2009.01)
*H04L 5/00* (2006.01)

(52) U.S. Cl.
CPC ............ *H04W 16/28* (2013.01); *H04L 5/0051* (2013.01)

(58) Field of Classification Search
CPC ............................. H04W 16/28; H04L 5/0051
See application file for complete search history.

(56) References Cited

U.S. PATENT DOCUMENTS

| | | | |
|---|---|---|---|
| 10,985,825 B2* | 4/2021 | Xiong | H04W 72/23 |
| 11,134,492 B2* | 9/2021 | Guo | H04L 5/0085 |
| 2010/0208633 A1 | 8/2010 | Takano | |
| 2018/0288645 A1* | 10/2018 | Lee | H04B 17/382 |
| 2019/0028167 A1* | 1/2019 | Chang | H04B 7/063 |

(Continued)

FOREIGN PATENT DOCUMENTS

| | | |
|---|---|---|
| CN | 110235508 A | 9/2019 |
| CN | 110536471 A | 12/2019 |

(Continued)

OTHER PUBLICATIONS

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

(Continued)

*Primary Examiner* — Fahmida S Chowdhury
(74) *Attorney, Agent, or Firm* — ALSTON & BIRD LLP

(57) ABSTRACT

Embodiments of the present disclosure relate to beam reporting triggered by data transmission. A first device receives from a second device configuration information concerning at least one candidate beam for serving the first device. The first device determines whether data is available for transmission from the first device to the second device. If the data is available for transmission, the first device selects at least one first reference signal identifying the at least one candidate beam based on the configuration information. The first device transmits information concerning the selected at least one first reference signal to the second device.

20 Claims, 5 Drawing Sheets

(56) References Cited

U.S. PATENT DOCUMENTS

| | | | |
|---|---|---|---|
| 2019/0098520 A1* | 3/2019 | Kim | H04W 76/27 |
| 2019/0104514 A1 | 4/2019 | Kannan et al. | |
| 2019/0116613 A1* | 4/2019 | Abedini | H04W 74/0833 |
| 2019/0190582 A1* | 6/2019 | Guo | H04B 17/327 |
| 2019/0191440 A1 | 6/2019 | Wang et al. | |
| 2019/0223043 A1* | 7/2019 | Geng | H04W 36/305 |
| 2019/0253949 A1* | 8/2019 | Park | H04W 76/19 |
| 2019/0261234 A1* | 8/2019 | Park | H04W 36/085 |
| 2019/0261425 A1* | 8/2019 | Park | H04W 76/27 |
| 2019/0306875 A1* | 10/2019 | Zhou | H04W 72/21 |
| 2019/0306909 A1* | 10/2019 | Zhou | H04W 72/23 |
| 2019/0350028 A1 | 11/2019 | Kaasalainen et al. | |
| 2020/0045715 A1* | 2/2020 | Li | H04W 72/0453 |
| 2020/0214018 A1* | 7/2020 | Venugopal | H04B 7/088 |
| 2020/0221429 A1* | 7/2020 | Li | H04W 72/23 |
| 2020/0260300 A1* | 8/2020 | Cirik | H04W 36/305 |
| 2020/0288334 A1 | 9/2020 | Takeda et al. | |
| 2020/0314664 A1* | 10/2020 | Zhou | H04B 7/0617 |
| 2021/0037530 A1 | 2/2021 | Shih et al. | |
| 2021/0058913 A1* | 2/2021 | Jang | H04W 72/046 |
| 2021/0235407 A1 | 7/2021 | Zhang et al. | |
| 2021/0243660 A1* | 8/2021 | Xie | H04W 74/0838 |
| 2021/0243777 A1* | 8/2021 | Tsai | H04W 74/006 |
| 2021/0274526 A1 | 9/2021 | Shin et al. | |
| 2022/0201636 A1 | 6/2022 | Liu et al. | |
| 2022/0201766 A1* | 6/2022 | Gao | H04W 72/1268 |
| 2022/0225421 A1* | 7/2022 | Miao | H04B 7/0695 |
| 2023/0008945 A1* | 1/2023 | Zhang | H04W 72/23 |
| 2023/0090741 A1* | 3/2023 | Dong | H04W 76/27 370/329 |
| 2023/0379815 A1* | 11/2023 | Wang | H04W 48/20 |

FOREIGN PATENT DOCUMENTS

| | | |
|---|---|---|
| CN | 110690947 A | 1/2020 |
| CN | 110719154 A | 1/2020 |
| EP | 3 456 083 A1 | 3/2019 |
| EP | 3681055 A1 | 7/2020 |
| EP | 3 823 384 A1 | 5/2021 |
| EP | 3 952 567 A1 | 2/2022 |
| JP | 2010/193250 A | 9/2010 |
| WO | WO 2017/196249 A1 | 11/2017 |
| WO | 2017/221202 A1 | 12/2017 |
| WO | WO 2019/039986 A1 | 2/2019 |
| WO | WO 2019/049369 A1 | 3/2019 |
| WO | WO 2020/032629 A1 | 2/2020 |
| WO | WO 2020/034571 A1 | 2/2020 |
| WO | 2020/063126 A1 | 4/2020 |
| WO | WO 2020/188144 A1 | 9/2020 |
| WO | WO 2020/204637 A1 | 10/2020 |

OTHER PUBLICATIONS

"MAC Running CR for NR eMIMO", 3GPP TSG-RAN WG2 Meeting #109 electronic, R2-2001706, Samsung, Feb. 24-Mar. 6, 2020, 82 pages.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"IEEE 802.11", Wikipedia, Retrieved on Feb. 24, 2022, Webpage available at : https://en.wikipedia.org/wiki/IEEE_802.11.

International Search Report and Written Opinion received for corresponding Patent Cooperation Treaty Application No. PCT/CN2020/083817, dated Dec. 30, 2020, 9 pages.

"CN and RAN interaction for inactive Ues", 3GPP TSG-RAN WG2 #95bis, R2-166919, Agenda: 9.2.2.1, Ericsson, Oct. 10-14, 2016, 4 pages.

"Link management procedures with WUS", 3GPP TSG-RAN WG2 Meeting #108, R2-1916176, Agenda: 6.11.2, Qualcomm Inc, Nov. 18-22, 2019, pp. 1-4.

"Remaining Details on Beam Recovery", 3GPP TSG-RAN WG1 NR AH #1801, R1-1800752, Agenda: 7.2.2.4, Nokia, Jan. 22-26, 2018, 4 pages.

Extended European Search Report received for corresponding European Patent Application No. 20929720.9, dated Mar. 14, 2023, 10 pages.

"Remaining details on beam failure recovery", 3GPP TSG RAN WG1 Meeting 91, R1-1719423, Agenda: 7.2.2.4, Huawei, Nov. 27-Dec. 1, 2017, 9 pages.

Office action received for corresponding Vietnamese Patent Application No. 1-2022-06764, dated Nov. 10, 2022, 2 pages of office action and 1 page of translation available.

Notice of Reasons for Refusal for Japanese Application No. 2022-561606 dated Nov. 27, 2023, 7 pages.

Office Action received for corresponding Indian Patent Application No. 202247063571, dated Jan. 10, 2023, 5 pages.

* cited by examiner

BEAM REPORTING TRIGGERED BY DATA TRANSMISSION

RELATED APPLICATION

This application was originally filed as PCT Application No. PCT/CN2020/083817 on Apr. 8, 2020, which is incorporated herein by reference in its entirety.

FIELD

Embodiments of the present disclosure generally relate to the field of telecommunication and in particular, to devices, methods, apparatuses and computer readable storage media for beam reporting triggered by data transmission.

BACKGROUND

New Radio (NR) supports an inactive state for a terminal device. In the inactive state, the terminal device with an infrequent data transmission is generally maintained by a network device. Until Release 16, the inactive state does not support data transmission. Hence, the terminal device has to resume a connected state for any data transmission. Even though data packets are small and infrequent, connection setup and subsequently release to the inactive state shall happen for each data transmission. This results in unnecessary power consumption and signalling overhead.

SUMMARY

In general, example embodiments of the present disclosure provide a solution for beam reporting triggered by data transmission.

In a first aspect, there is provided a first device. The first device comprises at least one processor; and at least one memory including computer program codes; the at least one memory and the computer program codes are configured to, with the at least one processor, cause the first device to: receive from a second device configuration information concerning at least one candidate beam for serving the first device; in accordance with a determination that data is available for transmission from the first device to the second device, select at least one first reference signal identifying the at least one candidate beam based on the configuration information; and transmit information concerning the selected at least one first reference signal to the second device.

In a second aspect, there is provided a second device. The second device comprises at least one processor; and at least one memory including computer program codes; the at least one memory and the computer program codes are configured to, with the at least one processor, cause the second device to: transmit to a first device in an inactive state configuration information concerning at least one candidate beam for serving the first device; receive from the first device information concerning at least one first reference signal identifying the at least one candidate beam; select a target beam from the at least one candidate beam based on the information concerning the at least one first reference signal; and serve the first device by using the target beam.

In a third aspect, there is provided a method implemented at a first device. The method comprises: receiving, at a first device from a second device configuration information concerning at least one candidate beam for serving the first device; in accordance with a determination that data is available for transmission from the first device to the second device, selecting at least one first reference signal identifying the at least one candidate beam based on the configuration information; and transmitting information concerning the selected at least one first reference signal to the second device.

In a fourth aspect, there is provided a method implemented at a second device. The method comprises: transmitting from a second device to a first device in an inactive state configuration information concerning at least one candidate beam for serving the first device; receiving from the first device information concerning at least one first reference signal identifying the at least one candidate beam; selecting a target beam from the at least one candidate beam based on the information concerning the at least one first reference signal; and serving the first device by using the target beam.

In a fifth aspect, there is provided an apparatus comprising means for performing steps of the method according to the above third aspect.

In an sixth aspect, there is provided an apparatus comprising means for performing steps of the method according to the above fourth aspect.

In a seventh aspect, there is provided a non-transitory computer readable medium comprising a computer program for causing an apparatus to perform at least the method according to the above third aspect.

In an eighth aspect, there is provided a non-transitory computer readable medium comprising a computer program for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
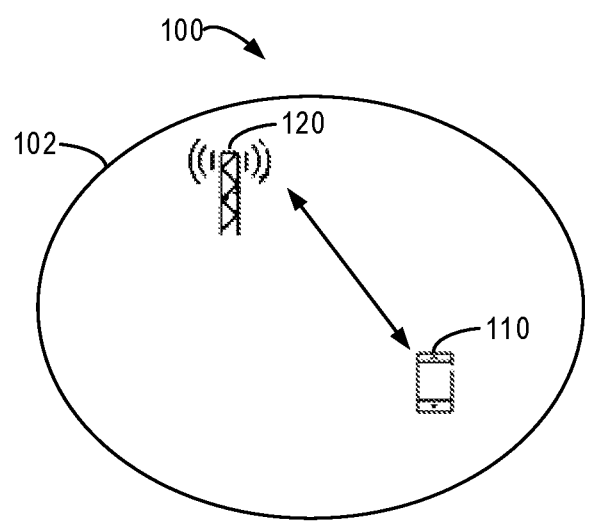
FIG. 1 illustrates an example communication system in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), Integraged Access and Backhaul node, a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) or NR and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some embodiments, the first device 110 may be in an inactive state. In the inactive state, the first device 110 may perform small and infrequent data transmission to the second device 120. Examples of small and infrequent data traffic may relate to smartphone applications or non-smartphone applications. The smartphone applications may relate to at least one of the following: traffic from Instant Messaging (IM) services (such as whatsapp, QQ, wechat and so on), heart-beat or keep-alive traffic from IM or email clients and other applications, or push notifications from various applications. The non-smartphone applications may relate to at least one of the following: traffic from wearables (such as periodic positioning information), sensors (Industrial Wireless Sensor Networks transmitting temperature, pressure readings periodically or in an event triggered manner and so on), or smart meters and smart meter networks sending periodic meter readings.

In some embodiments, in the case where Timing Advance for the first device 110 is valid, the first device 110 may perform the small and infrequent data transmission on resources pre-configured by the second device 120. In other words, the first device 110 may perform the small and infrequent data transmission by reusing a configured grant type 1 in the inactive state. The second device 120 may pre-configure such resources for the first device 110 by using a dedicated signalling or a broadcast signalling. Examples of the pre-configured resources may include, but are not limited to resources on a physical uplink shared channel (PUSCH).

In other embodiments, in the case where the Timing Advance for the first device 110 is invalid, the first device 110 may perform the small and infrequent data transmission by performing a random access (RA) procedure. In some embodiments, the random access procedure may be a random access procedure comprising two steps. In other embodiments, the random access procedure may be a random access procedure comprising four steps.

In the case of the random access procedure comprising two steps, the first device 110 may perform the small and infrequent data transmission by using the MSGA. In the case of the random access procedure comprising four steps, the first device 110 may perform the small and infrequent data transmission by using the MSG3.

In embodiments where the communication system 100 may be implemented as a NR system, the NR system shall be efficient and flexible for low throughput short data bursts, support efficient signalling mechanisms and reduce signalling overhead in general. In order to support the efficient signalling mechanisms, signalling shall be less than payload.

Signalling overhead from devices in the inactive state for small data packets is a general problem. It will become a critical issue with more devices in the NR system not only for network performance and efficiency but also for battery performance of the devices. In general, any device that has intermittent small data packets in the inactive state will benefit from enabling small data transmission in the inactive state.

In addition, for the NR system with multiple beams, different resources on a physical random access channel (PRACH) and/or preambles can be configured for different beams. The beams may be corresponding to Synchronization Signal Block (SSB) indexes or Channel State Information Reference Signal (CSI-RS) indexes. In other words, the resources on the PRACH and/or the preambles may be associated with different beams. Thus, upon reception of a preamble on a resource on the PRACH from a terminal device, a network device may know which beam is to be used for serving the terminal device. Besides, in a connected mode, the terminal device keeps beam failure monitoring and triggers a beam failure recovery (BFR) procedure when a current beam is becoming too weak.

However, the pre-configured resources on the PUSCH or resources on the PRACH may be configured only for a subset of beams given the increased resource consumption they introduce. Hence, even though the resources for uplink transmission would be associated with beams for serving terminal devices, such beams might not be preferred by the terminal devices to be served from.

In order to solve the above technical problems and potentially other technical problems in conventional solutions, embodiments of the present disclosure provide a solution for beam reporting triggered by data transmission. In some embodiments, if data is available for transmission from a first device to a second device, the first device selects at least one reference signal identifying the at least one candidate beam based on configuration information. If the selected at least one reference signal is not associated with resources for transmission of the data or resources for transmission of an RA request from the first device to the second device, the first device transmits information concerning the selected at least one reference signal to the second device. Upon receiving the information concerning the at least one reference signal, the second device selects a target beam from the at least one candidate beam based on the information. In turn, the second device serves the first device by using the target beam.

Figure 2:
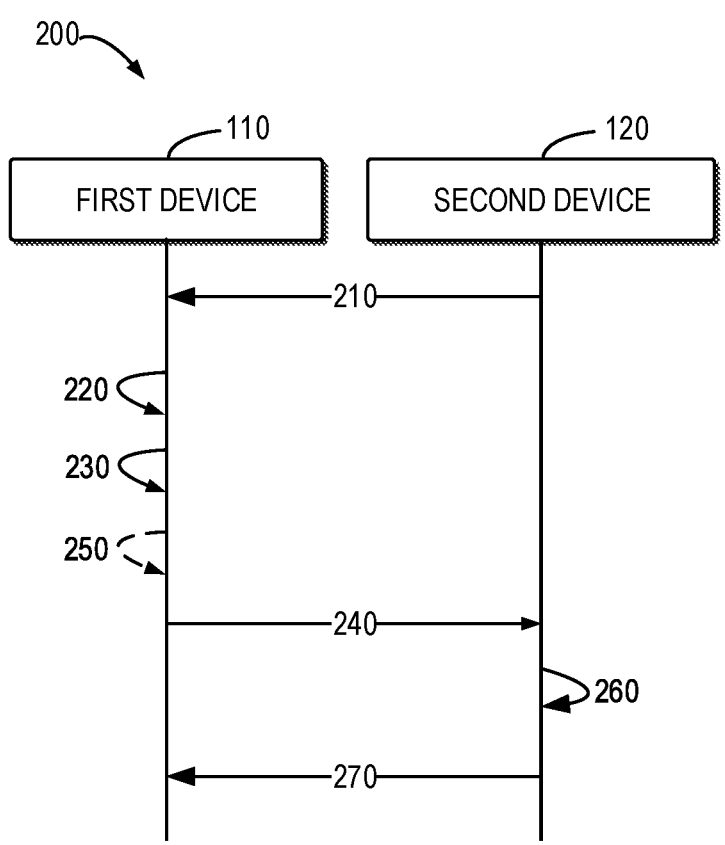
FIG. 2 illustrates a signaling chart illustrating a process for beam reporting triggered by data transmission according to some example embodiments of the present disclosure.

Reference is now made to FIG. 2, which shows a signaling chart illustrating a process 200 for beam reporting triggered by data transmission according to some example embodiments of the present disclosure. For the purpose of discussion, the process 200 will be described with reference to FIG. 1. The process 200 may involve the first device 110 and the second device 120 as illustrated in FIG. 1. Although the process 200 has been described in the communication system 100 of FIG. 1, this process may be likewise applied to other communication scenarios. Although beam reporting by the first device is discussed, a similar process can be applied to the second device.

The first device 110 receives 210 from the second device 120 configuration information concerning at least one candidate beam for serving the first device 110.

In some embodiments, the first device 110 receives the configuration information via a dedicated signaling. Examples of the dedicated signaling include, but are not limited to, a radio resource control (RRC) release message. Of course, other dedicated signaling than the RRC release message may be used. The scope of the present disclosure is not limited thereto.

Alternatively, the first device 110 receives the configuration information via a broadcast signaling. Examples of the broadcast signaling include, but are not limited to, system information.

The first device 110 determines 220 whether data is available for transmission from the first device 110 to the second device 120. If the data is available for transmission, the first device 110 selects 230 at least one first reference signal identifying the at least one candidate beam based on the configuration information.

The first device 110 transmits 240 information concerning the selected at least one first reference signal to the second device 120.

In some embodiments, the first device 110 determines 250 whether the selected at least one first reference signal is associated with at least one of the resources for transmission of the data, or resources for transmission of an RA request from the first device 110 to the second device 120. If the selected at least one first reference signal is not associated with the resources for transmission of the data or the resources for transmission of the RA request, the first device 110 transmits the information concerning the selected at least one first reference signal to the second device 120.

Upon receiving the information concerning the selected at least one first reference signal from the first device 110, the second device 120 selects 260 a target beam from the at least one candidate beam based on the information concerning the at least one first reference signal.

In turn, the second device 120 serves 270 the first device 110 by using the target beam. In some embodiments, the second device 120 may transmit a response to reception of the information concerning the at least one first reference signal by using the target beam. In other embodiments, the second device 120 may transmit a response to reception of data from the first device 110 by using the target beam.

On the other hand, if the first device 110 determines at 250 that the selected at least one first reference signal is associated with the resources for transmission of the data or the resources for transmission of the RA request, the first device 110 may transmit the data on the resources for transmission of the data or the RA request on the resources for transmission of the RA request. Upon receiving the data or the RA request from the first device 110, the second device 120 may determine a beam for serving the first device 110 based on the resources.

According to some embodiments of the present disclosure, the first device 110 transmits the information concerning the selected at least one first reference signal to the second device 120. In this way, even though the selected at least one first reference signal is not associated with the resources for transmission of the data or the resources for transmission of the RA request, the second device 120 may determine the beam for serving the first device 110 based on the information concerning the selected at least one first reference signal.

In some embodiments, the first device 110 may select the at least one first reference signal based on comparison of the following with at least one threshold: a first received power of the at least one first reference signal. The at least one second reference signal is associated with the resources for transmission of the data or the resources for transmission of the RA request.

In such embodiments, the first device 110 may determine whether the first received power is above a first threshold power. If the first received power is above the first threshold power, the first device 110 may further determine whether the second received power is below a second threshold power. The first threshold power is above the second threshold power. In other words, the first threshold power is greater than or equal to the second threshold power. If the second received power is below the second threshold power, the first device 110 may select the at least one first reference signal.

Consider an example. In the example, the first device 110 receives a reference signal X associated with a beam X, a reference signal Y associated with a beam Y, and a reference signal Z associated with a beam Z. The reference signals X and Y are not associated with the resources for transmission of the data or the resources for transmission of the RA request. The reference signal Z is associated with the resources for transmission of the data or the resources for transmission of the RA request.

The first device 110 measures respective received powers of the reference signals X, Y and Z. The received power of the reference signal X is −70 dBm. The received power of the reference signal Y is −80 dBm. The received power of the reference signal Z is −90 dBm. The first threshold power is −85 dBm. Because the received powers of the reference signals X and Y are above the first threshold power, the first device 110 may select one of the reference signals X and Y. For example, the first device 110 may select the reference signal X. Then, the first device 110 may transmit to the second device 120 information concerning the selected reference signal X identifying the beam X. Upon receiving the information concerning the selected reference signal X, the second device 120 may determine that the beam X is to be used for serving the first device 110.

Alternatively, the first device 110 may select the reference signal Y. Then, the first device 110 may transmit to the second device 120 information concerning the selected reference signal Y identifying the beam Y. Thus, upon receiving the information concerning the selected reference signal Y, the second device 120 may determine that the beam Y is to be used for serving the first device 110.

Alternatively, the first device 110 may select both the reference signal X and the reference signal Y. Then, the first device 110 may transmit to the second device 120 information concerning the selected reference signals X and Y identifying the beams X and Y. Thus, upon receiving the information concerning the selected reference signals X and Y, the second device 120 may select one of the beam X and the beam Y for serving the first device 110.

In some embodiments, the comparison of the first and second received powers with at least one threshold may comprise comparison of a difference between the first received power and the second received power with a third threshold power. In such embodiments, the first device 110 may determine whether the difference is above the third threshold power. If the difference is above the third threshold power, the first device 110 selects the at least one first reference signal.

In some embodiments, the configuration information comprises information concerning the at least one threshold. Alternatively, the at least one threshold may be predefined.

In some embodiments, the configuration information comprises information concerning the number of the at least one first reference signal.

In some embodiments, the number of the at least one first reference signal may be a variable number depending on the numbers of reference signals above a threshold. For example, the threshold may be the first threshold.

In some embodiments, the first device 110 may transmit the information concerning the selected at least one first reference signal together with data. Alternatively, the first device 110 may transmit the information concerning the selected at least one first reference signal and data separately.

In some embodiments, the at least one first reference signal comprises at least one Channel State Information Reference Signal (CSI-RS). In such embodiments, the information concerning the selected at least one first reference signal may comprise index of at least one CSI-RS.

In some embodiments, the at least one first reference signal comprises at least one Synchronization Signal Block (SSB). In such embodiments, the information concerning the selected at least one first reference signal may comprise index of at least one SSB.

In some embodiments, the first device 110 may transmit the information concerning the selected at least one first reference signal in a Medium Access Control control element (MAC CE). In some embodiments, a new MAC CE may be defined for transmit the information. Different from the traditional BFR MAC CE, the new MAC CE may not comprise a bitmap for serving cells because there is only one cell where the data transmission happens and the information needs to be transmitted. Because the new MAC CE may not comprise the bitmap, overhead may be reduced.

In some embodiments, the first device 110 may transmit a MAC protocol data unit (PDU) comprising a MAC subheader and the MAC CE. In some embodiments, a length field in the MAC subheader may indicate the number of the selected at least one first reference signal in the MAC CE.

Figure 3:
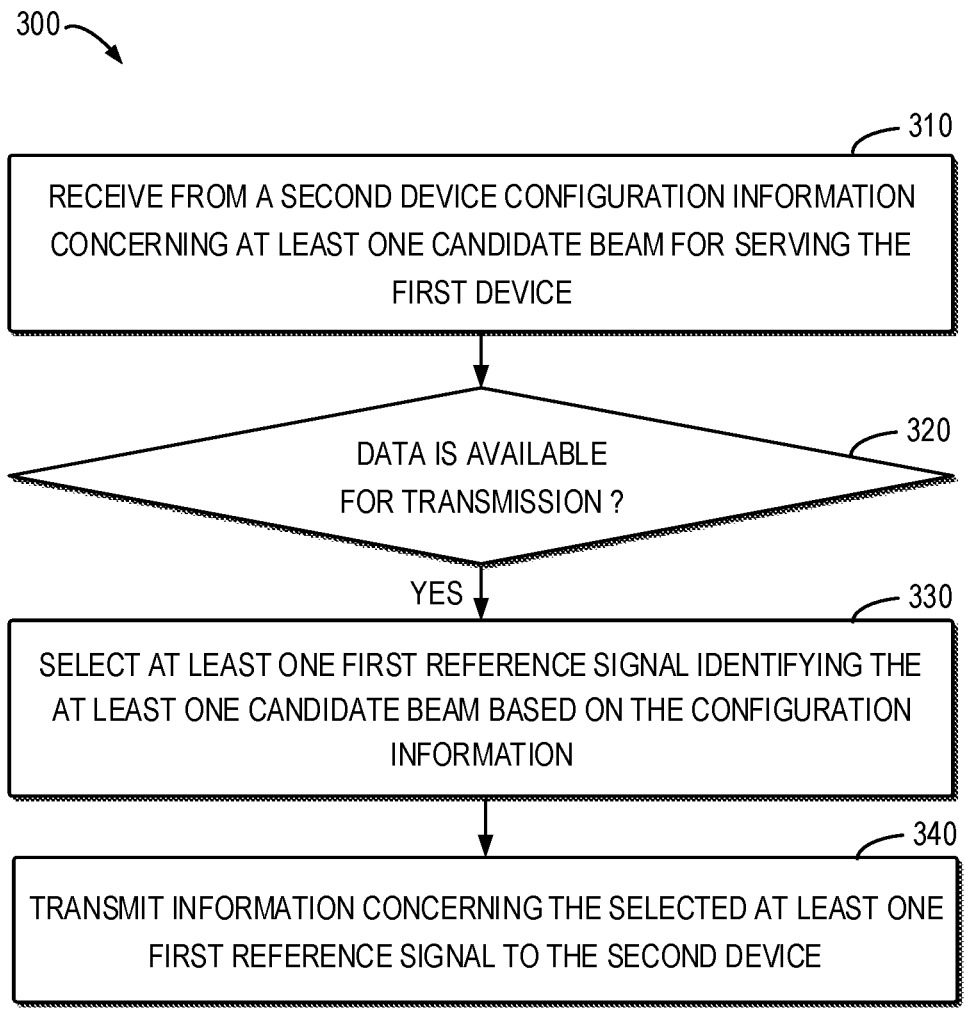
FIG. 3 illustrates a flowchart of a method implemented at a first device according to some example embodiments of the present disclosure.

FIG. 3 shows a flowchart of an example method 300 implemented at a first device in accordance with some example embodiments of the present disclosure. For the purpose of discussion, the method 300 will be described from the perspective of the first device 110 with reference to FIG. 1. It would be appreciated that the method 300 may also be implemented at the second device 120 in FIG. 1.

At block 310, the first device 110 receives from the second device 120 configuration information concerning at least one candidate beam for serving the first device 110.

At block 320, the first device 110 determines whether data is available for transmission from the first device 110 to the second device 120.

If the data is available for transmission, the first device 110 selects at block 330 at least one first reference signal identifying the at least one candidate beam based on the configuration information.

At block 340, the first device 110 transmits information concerning the selected at least one first reference signal to the second device 120.

In some embodiments, the first device 110 determines whether the selected at least one first reference signal is associated with at least one of the resources for transmission of the data, or resources for transmission of an RA request from the first device 110 to the second device 120. If the selected at least one first reference signal is not associated with the resources for transmission of the data or the resources for transmission of the RA request, the first device 110 transmits the information concerning the selected at least one first reference signal to the second device 120.

In some embodiments, the first device 110 selects the at least one first reference signal based on comparison of the following with at least one threshold: a first received power of the at least one first reference signal, and a second received power of at least one second reference signal associated with the resources.

In some embodiments, the first device 110 determines whether the first received power is above a first threshold power. If the first received power is above the first threshold power, the first device 110 determines whether the second received power is below a second threshold power. The first threshold power is above the second threshold power. If the second received power is below the second threshold power, the first device 110 selects the at least one first reference signal.

In some embodiments, the first device 110 determines a difference between the first received power and the second received power. If the difference is above a third threshold power, the first device 110 selects the at least one first reference signal.

In some embodiments, the first device 110 transmits the information with the data.

In some embodiments, the first device 110 transmits the information in a MAC CE.

In some embodiments, the first device 110 receives the configuration information via at least one of the following: a dedicated signalling, or a broadcast signalling.

In some embodiments, the configuration information comprises information concerning at least one of the following: a list of reference signals for the first device 110 to select the at least one first reference signal from, the at least one threshold, or the number of the at least one first reference signal, the information of which is to be transmitted to the second device 120.

In some embodiments, the first device 110 comprises a terminal device, and the second device 120 comprises a network device.

Figure 4:
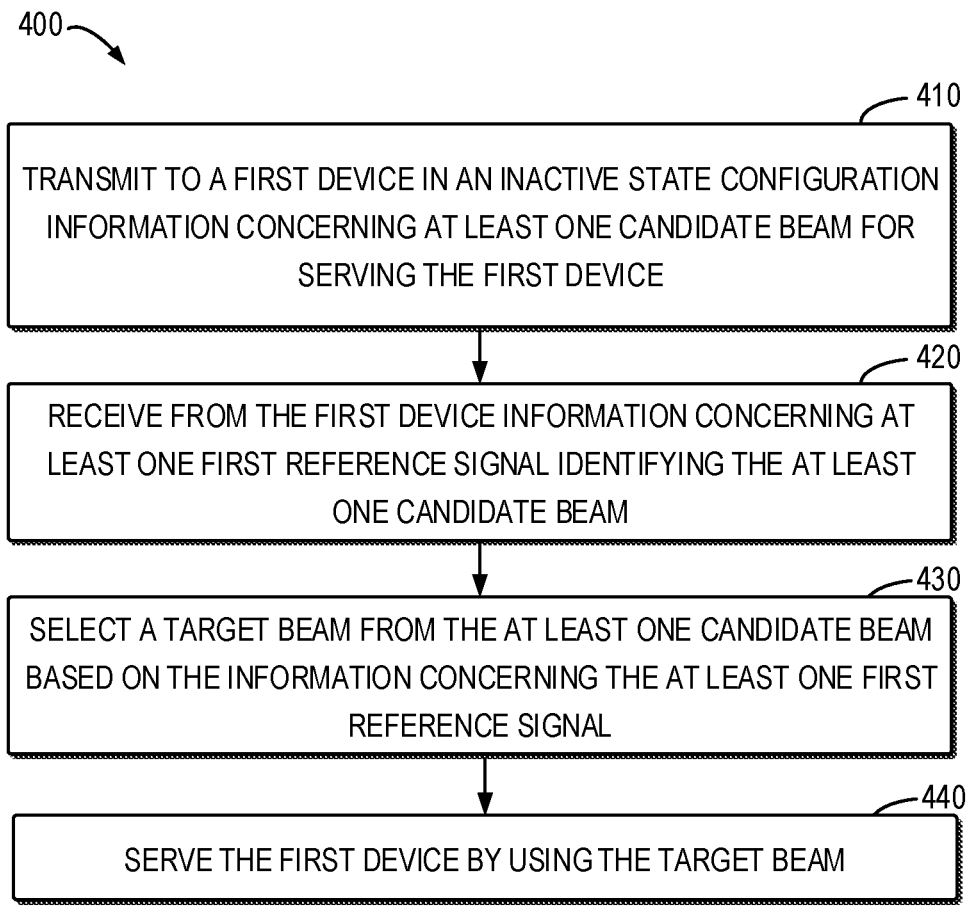
FIG. 4 illustrates a flowchart of a method implemented at a second device according to some example embodiments of the present disclosure.

FIG. 4 shows a flowchart of an example method 400 implemented at a first device in accordance with some example embodiments of the present disclosure. For the purpose of discussion, the method 400 will be described from the perspective of the second device 120 with reference to FIG. 1. It would be appreciated that the method 400 may also be implemented at the first device 110 in FIG. 1.

At block 410, the second device 120 transmits to the first device 110 in an inactive state configuration information concerning at least one candidate beam for serving the first device.

At block 420, the second device 120 receives from the first device 110 information concerning at least one first reference signal identifying the at least one candidate beam.

At block 430, the second device 120 selects a target beam from the at least one candidate beam based on the information concerning the at least one first reference signal.

At block 440, the second device 120 serves the first device 110 by using the target beam.

In some embodiments, the at least one first reference signal is disassociated with at least one of the following: resources for transmission of data from the first device to the second device, or resources for transmission of a random access request from the first device to the second device.

In some embodiments, the second device 120 receives the information with the data.

In some embodiments, the second device 120 receives the information in a MAC CE.

In some embodiments, the second device 120 transmits the configuration information via at least one of the following: a dedicated signalling, or a broadcast signalling.

In some embodiments, the configuration information comprises information concerning the number of the at least one first reference signal.

In some embodiments, the first device 110 comprises a terminal device, and the second device 120 comprises a network device.

In some embodiments, an apparatus capable of performing any of the method 300 (for example, the first device 110 or the second device 120) may comprise means for performing the respective steps of the method 300. The means may be implemented in any suitable form. For example, the means may be implemented in a circuitry or software module.

In some example embodiments, the apparatus comprises means for receiving, at a first device from a second device configuration information concerning at least one candidate beam for serving the first device; in accordance with a determination that data is available for transmission from the first device to the second device, means for selecting at least one first reference signal identifying the at least one candidate beam based on the configuration information; and means for transmitting information concerning the selected at least one first reference signal to the second device.

In some embodiments, the selected at least one first reference signal is disassociated with at least one of the following: resources for transmission of the data, or resources for transmission of a random access request from the first device to the second device.

In some embodiments, the means for selecting comprises the means for selecting the at least one first reference signal based on comparison of the following with at least one threshold: a first received power of the at least one first reference signal, and a second received power of at least one second reference signal associated with the resources.

In some embodiments, the means for selecting comprises: in accordance with a determination that the first received power is above a first threshold power, means for determining whether the second received power is below a second threshold power, the first threshold power being above the second threshold power; and in accordance with a determination that the second received power is below the second threshold power, means for selecting the at least one first reference signal.

In some embodiments, the means for selecting comprises: means for determining a difference between the first received power and the second received power; and in accordance with a determination that the difference is above a third threshold power, means for selecting the at least one first reference signal.

In some embodiments, the means for transmitting the information comprises means for transmitting the information with the data.

In some embodiments, the means for transmitting the information comprises means for transmitting the information in a Medium Access Control control element.

In some embodiments, the means for receiving the configuration information comprises means for receiving the configuration information via at least one of the following: a dedicated signalling, or a broadcast signalling.

In some embodiments, the configuration information comprises information concerning at least one of the following: the at least one threshold, or the number of the at least one first reference signal.

In some embodiments, the first device comprises a terminal device, and the second device comprises a network device.

In some embodiments, an apparatus capable of performing any of the method 400 (for example, the first device 110 or the second device 120) may comprise means for performing the respective steps of the method 400. The means may be implemented in any suitable form. For example, the means may be implemented in a circuitry or software module.

In some example embodiments, the apparatus comprises means for transmitting from a second device to a first device in an inactive state configuration information concerning at least one candidate beam for serving the first device; means for receiving from the first device information concerning at least one first reference signal identifying the at least one candidate beam; means for selecting a target beam from the at least one candidate beam based on the information concerning the at least one first reference signal; and means for serving the first device by using the target beam.

In some embodiments, the at least one first reference signal is disassociated with at least one of the following: resources for transmission of data from the first device to the second device, or resources for transmission of a random access request from the first device to the second device.

In some embodiments, the means for receiving comprises means for receiving the information with the data.

In some embodiments, the means for receiving comprises means for receiving the information in a Medium Access Control control element.

In some embodiments, means for transmitting comprises means for transmitting the configuration information via at least one of the following: a dedicated signalling, or a broadcast signalling.

In some embodiments, the configuration information comprises information concerning the number of the at least one first reference signal.

In some embodiments, the first device comprises a terminal device, and the second device comprises a network device.

Figure 5:
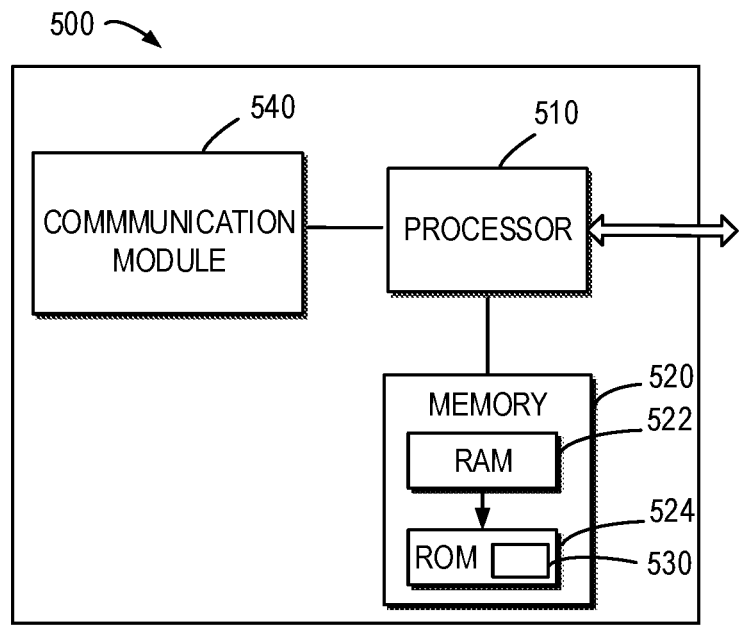
FIG. 5 illustrates a simplified block diagram of an apparatus that is suitable for implementing embodiments of the present disclosure.

FIG. 5 is a simplified block diagram of a device 500 that is suitable for implementing embodiments of the present disclosure. The device 500 may be provided to implement the communication device, for example, the first device 110 or the second device 120 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

Figure 6:
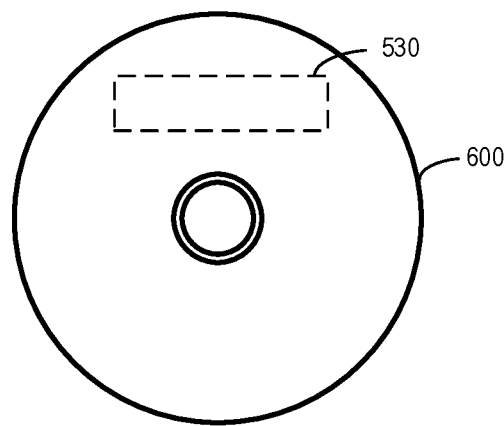
FIG. 6 illustrates a block diagram of an example computer readable medium in accordance with some example embodiments of the present disclosure.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900 and 1000 as described above with reference to FIGS. 9 and 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory comprising instructions stored thereon that, when executed by the at least one processor, cause the first device to perform at least:
     receiving, from a second device, configuration information concerning at least one candidate beam associated with a pre-configured uplink resource configured by the second device for the first device;
     determining, while the first device is in an inactive state, that data is available for transmission;
     selecting, by the first device while in the inactive state, a beam from the at least one candidate beam based on the configuration information, wherein the selected beam is identified by a first reference signal to the first device; and
     transmitting, by the first device while the first device is in the inactive state, to the second device, the data on the pre-configured uplink resource using the selected beam.

2. The first device of claim 1, wherein the first reference signal is disassociated with at least one of the following:
   resources for transmission of the data, or
   resources for transmission of a random access request from the first device to the second device.

3. The first device of claim 2, wherein the selected beam is identified based on a comparison of the following with at least one threshold:
   a first received power of the first reference signal, and
   a second received power of at least one second reference signal associated with the resources.

4. The first device of claim 3, wherein the selecting the beam from the at least one candidate beam based on the configuration information comprises:
   in accordance with a determination that the first received power is above a first threshold power, determining whether the second received power is below a second threshold power, the first threshold power being above the second threshold power; and
   in accordance with a determination that the second received power is below the second threshold power, selecting the beam.

5. The first device of claim 3, wherein the selecting the beam from the at least one candidate beam based on the configuration information comprises:
   determining a difference between the first received power and the second received power; and
   in accordance with a determination that the difference is above a third threshold power, selecting the beam.

6. The first device of claim 1, wherein the receiving the configuration information comprises receiving the configuration information via at least one of the following:
   a dedicated signalling, or
   a broadcast signalling.

7. The first device of claim 3, wherein the configuration information comprises information concerning at least one of the following:
   the at least one threshold, or
   a number of the at least one candidate beam.

8. The first device of claim 1, wherein the first device comprises a terminal device, and the second device comprises a network device.

9. A second device comprising:
   at least one processor; and
   at least one memory comprising instructions stored thereon that, when executed by the at least one processor, cause the second device to perform at least:
     transmitting, to a first device, configuration information concerning at least one candidate beam associated with a pre-configured uplink resource for the first device;
     receiving, from the first device, while the first device is in an inactive state, data on the pre-configured uplink resource using a beam selected by the first device and identified by a first reference signal; and
     serving the first device by using the selected beam.

10. The second device of claim 9, wherein the first reference signal is disassociated with at least one of the following:
    resources for transmission of data from the first device to the second device, or
    resources for transmission of a random access request from the first device to the second device.

11. The second device of claim 9, wherein the transmitting the configuration information comprises transmitting the configuration information via at least one of the following:
    a dedicated signalling, or
    a broadcast signalling.

12. The second device of claim 9, wherein the configuration information comprises information concerning a number of the at least one candidate beam.

13. The second device of claim 9, wherein the first device comprises a terminal device, and the second device comprises a network device.

14. A method comprising:
    receiving, at a first device, from a second device, configuration information concerning at least one candidate beam associated with a pre-configured uplink resource for the first device;
    determining, by the first device, while the first device is in an inactive state, that data is available for transmission over the pre-configured uplink resource to the second device:
    selecting, by the first device in the inactive state, a beam from the at least one candidate beam based on the configuration information, wherein the selected beam is identified by a first reference signal to the first device; and
    transmitting, by the first device while the first device is in the inactive state, to the second device, the data on the pre-configured uplink resource using the selected beam.

15. The method of claim 14, wherein the first reference signal is disassociated with at least one of the following:
    resources for transmission of the data, or resources for transmission of a random access request from the first device to the second device.

16. The method of claim 15, wherein the selected beam is identified based on a comparison of the following with at least one threshold:
   a first received power of the first reference signal, and
   a second received power of at least one second reference signal associated with the resources.

17. The method of claim 16, wherein the selecting the beam from the at least one candidate beam based on the configuration information comprises:
   in accordance with a determination that the first received power is above a first threshold power, determining whether the second received power is below a second threshold power, the first threshold power being above the second threshold power; and
   in accordance with a determination that the second received power is below the second threshold power, selecting the beam.

18. The method of claim 16, wherein the selecting the beam from the at least one candidate beam based on the configuration information comprises:
   determining a difference between the first received power and the second received power; and
   in accordance with a determination that the difference is above a third threshold power, selecting the beam.

19. The method of claim 16, wherein the configuration information comprises information concerning at least one of the following:
   the at least one threshold, or
   a number of the at least one candidate beam.

20. The method of claim 14, wherein the first device comprises a terminal device, and the second device comprises a network device.

* * * * *